ns Patent Office 3,276,324
Patented Oct. 4, 1966

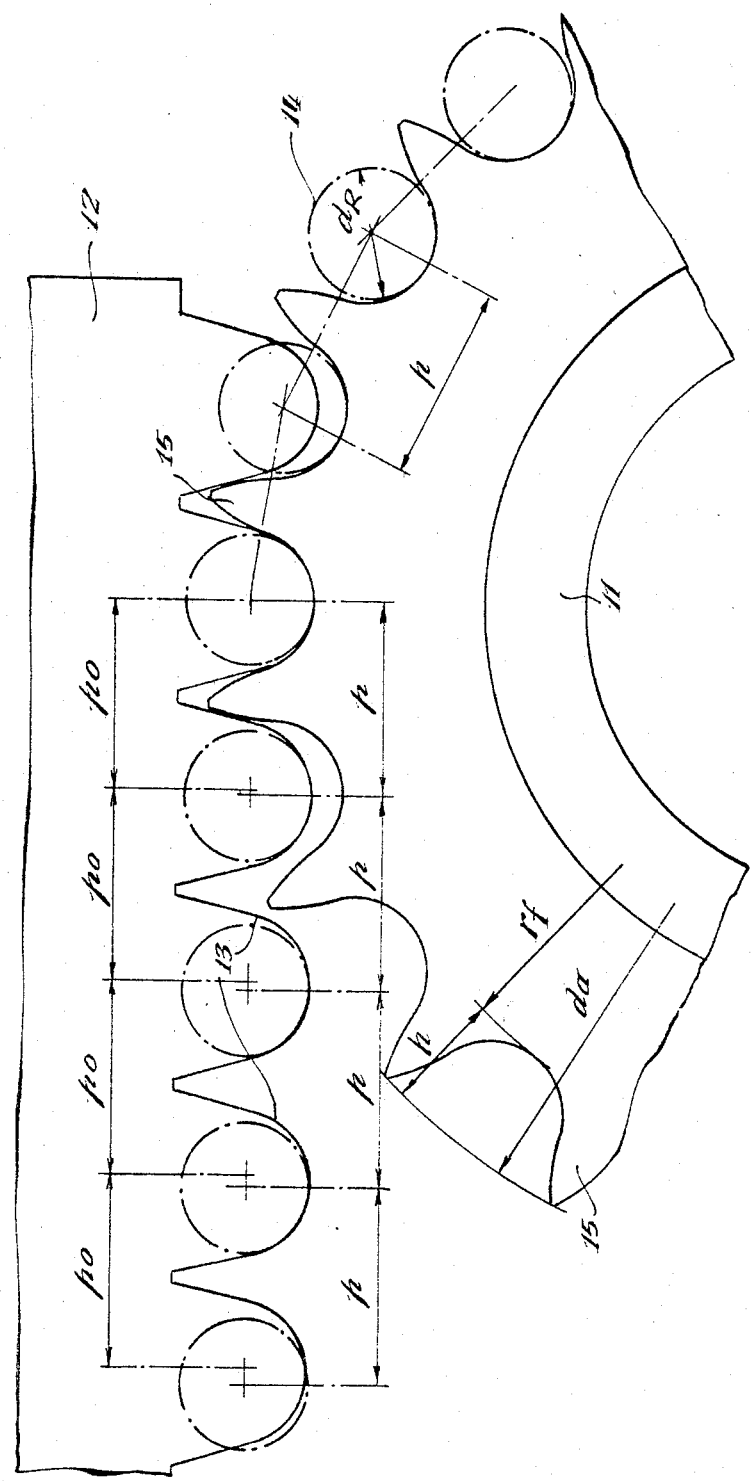

3,276,324
PROCESS FOR GENERATING SPROCKET WHEELS
Hans Grob, Zurich, Switzerland, assignor to Maag Gear Wheel & Machine Company Limited, Zurich, Switzerland, a company of Switzerland
Filed Dec. 3, 1963, Ser. No. 327,724
Claims priority, application Germany, Dec. 4, 1962, M 55,007
5 Claims. (Cl. 90—4)

This invention relates to a process for generating sprocket wheels by means of tools whose pitch differs from the chordal pitch of the finished sprocket wheel. The chordal pitch of a sprocket wheel is the distance from the centre of one tooth space to the centre of the next tooth space measured along a chord of the pitch circle, and is equal to the pitch of the chain which is to co-operate with the sprocket wheel.

The invention has particular reference to sprocket wheels for co-operation with chains which are known commercially as short-link roller chains.

In the conventional process for generating sprocket wheels, a single tool is used for cutting teeth on all sprocket wheels in a group having a small range of numbers of teeth thereon, the chordal pitch being the same on all sprocket wheels in the group, the pitch of the said single tool being adapted to the number of teeth on a selected sprocket wheel in such group. A large number of tools must therefore be provided to cover the whole range of numbers of teeth on a wheel, for instance, from 5 to 200 teeth, if the chains are to engage satisfactorily with the mating sprocket wheels. It is known for there to be minor discrepancies between the tool pitch and the workpiece pitch or chordal pitch, the tooth-number (that is, the number of teeth on a wheel) group for any particular tool being selected to allow for such discrepancies. Even in the most favourable case and using generation, three different tools have previously been necessary to avoid undercutting in the very low tooth numbers (down to 6 teeth) and to avoid foreshortening of the teeth in the high tooth numbers, The discrepancies are bridged in the same way by a step known, more particularly with reference to gear teeth, as "Profile shift." Previously, however, the only thing known for sprocket wheels in this connection has been to give the tools a greater pitch than corresponds to the chain pitch, but this gave a very limited combination of tooth numbers per tool.

A process for manufacturing sprocket wheels with one tool covering the tooth members 6 to 200 is known wherein the tool pitch is greater than the sprocket-wheel chordal pitch, but with the disadvantage that the tooth tops of the sprocket wheels must be foreshortened in some parts, with subsequent disadvantages in running (the chain jumps a tooth more readily).

The invention, with a view to simplifying manufacture and greatly reducing storage costs, has as its object to enable a single tool to be used for sprocket wheels having tooth numbers 5 to more than 200 without any foreshortening of the tooth tops and with satisfactory engagement between the chain and the sprocket wheel.

To this end, according to the invention, the sprocket wheels are produced by means of tools whose pitches are smaller than the chordal pitch of the finished sprocket wheels.

The process according to the invention is found to be very advantageous if the tool module is in the range of from 0.305 to 0.315 of the chordal pitch of the required sprocket wheels; very conveniently, such module is 19/61.

This is achieved with a relatively small flank angle of $2\alpha = 28°$ to $32°$, an angle which leads to a very advantageous construction of the generating tools, more particularly to the grinding disc having good access to the roots of the tool teeth. Notwithstanding all these advantages, there is no undesirable undercutting down to 5 teeth.

Another advantage is that small variations of chain roller diameter in different makes are permissible.

The height of the sprocket-wheel teeth increases as the tooth number increases, so that the chains can be used satisfactorily, that is, elongation can be relatively large. As a rule, the height of the tool teeth is a good 5% greater than chain roller diameter and can, if required, be used to a large extent, if not fully, for chains whose pitch-to-roller-diameter ratio is greater than 1.5. Backlash in the tooth spaces is very small.

The process according to the invention, and a tool for carrying out the process, are illustrated diagrammatically in the accompanying drawing, in which 11 is the sprocket wheel, 12 is the tool, 13 are the teeth on the tool 12, 14 are the rollers of a chain which is to co-operate with the wheel 11, and 15 are the teeth of the sprocket wheel.

It will be seen from the drawing that the tool pitch $p_0$ is smaller than the chain roller pitch $p$ which is also the chordal pitch of the sprocket wheel.

The flank angle of the sprocket-wheel teeth decreases as the number of teeth increases, a factor which helps to reduce noise and which assists prestressing in the idle run of the chain. Nevertheless, the flank angle is large enough to ensure that disturbances due to unequal elongation of chain links do not exceed the normal amount. Sprocket wheels are calculated, on the basis of the process according to the invention, from the following formulae:

$$r_f = p\left[\tfrac{1}{2} \cdot \operatorname{cosec} \frac{180°}{z} - 3z \cdot 10^{-5}\right] - 0.503 d_R$$

$$h = d_R \cdot \left[0.9360 - \frac{0.56}{z-2}\right]$$

$$d_a = 2(r_f + h)$$

where:

$r_f$ = root radius of the sprocket wheel;
$p$ = pitch of the chain, and the chordal pitch of the sprocket wheel;
$d_R$ = diameter of chain rollers;
$h$ = tooth height of the sprocket wheel;
$d_a$ = external diameter of the sprocket wheel;
$z$ = number of teeth (tooth number) on the sprocket wheel.

The sprocket wheels calculated from these particulars are produced in the normal way on gear-hobbing machines, the pitch-circle diameter for production being equal to the product of the tool module and the number of teeth of the wheel.

Tool dimensions are, in the conventional manner, a preferred magnitude in accordance with the pitch $p$, the roller diameter $d_R$ and the flank angle $2\alpha = 30$, it being possible for the tool to be a rack-shaped cutter or a hob (with straight parts as cutting flanks) or any other kind of generating tool, for instance, a single-tooth tool.

What I claim and desire to secure by Letters Patent is:
1. A process for generating sprocket wheels by means of tools whose pitch differs from the chordal pitch of the finished sprocket wheel, characterised in that tools are used which have a pitch which is smaller than the chordal pitch of the finished sprocket wheel.

2. A process according to claim 1, characterised in that the sprocket wheels are produced by tools whose module is within the range of from 0.315 to 0.305 of the chordal pitch of the sprocket wheel and whose flank angle $2\alpha$ is within the range of from 28° to 32°.

3. A process according to claim 1, characterised in that the sprocket wheels are produced by means of tools whose module is 19/61 of the chordal pitch of the sprocket wheel and whose flank angle $2\alpha = 30°$.

4. A process according to claim 1, characterised in that the root radius of the sprocket wheel is determined from the formula:

$$r_f = p\left[\tfrac{1}{2}\operatorname{cosec}\frac{180°}{z} - 3z \cdot 10^{-5}\right] - 0.503 d_R$$

where:
$r_f$ = root radius of the sprocket wheel;
$p$ = pitch of the chain, and the chordal pitch of the sprocket wheel;
$d_R$ = diameter of chain rollers;
$z$ = number of teeth (tooth number) on the sprocket wheel.

5. A process according to claim 1, characterised in that the tooth height of the sprocket wheel is determined from the formula:

$$h = d_R \cdot \left[0.9360 - \frac{0.56}{z-2}\right]$$

where:
$h$ = tooth height of the sprocket wheel;
$d_R$ = diameter of chain rollers;
$z$ = number of teeth (tooth number) on the sprocket wheel.

References Cited by the Examiner
UNITED STATES PATENTS

| | | | |
|---|---|---|---|
| 1,662,408 | 3/1928 | Trbopevich | 90—4 |
| 1,772,635 | 8/1930 | Olson. | |
| 2,864,153 | 12/1958 | Mahan. | |

WILLIAM W. DYER, JR., *Primary Examiner.*
LEONIDAS VLACHOS, *Examiner.*